United States Patent
Xu et al.

(10) Patent No.: US 9,814,041 B2
(45) Date of Patent: Nov. 7, 2017

(54) COMMUNICATION MODE SWITCHING METHOD AND DEVICE

(71) Applicant: Hytera Communications Corp., Ltd., Shenzhen, Guangdong (CN)

(72) Inventors: Yan Xu, Guangdong (CN); Chia Han Siong Samuel, Guangdong (CN); Yingzhe Zhang, Guangdong (CN); Zhenghua Luo, Guangdong (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 35 days.

(21) Appl. No.: 14/908,090

(22) PCT Filed: Jul. 24, 2014

(86) PCT No.: PCT/CN2014/082925
§ 371 (c)(1),
(2) Date: Jan. 27, 2016

(87) PCT Pub. No.: WO2015/014235
PCT Pub. Date: Feb. 5, 2015

(65) Prior Publication Data
US 2016/0165599 A1    Jun. 9, 2016

(30) Foreign Application Priority Data

Jul. 29, 2013  (CN) .......................... 2013 1 0324070

(51) Int. Cl.
*H04W 72/04*    (2009.01)
*H04W 24/04*    (2009.01)
(Continued)

(52) U.S. Cl.
CPC .......... *H04W 72/0446* (2013.01); *H04B 7/14* (2013.01); *H04L 5/006* (2013.01);
(Continued)

(58) Field of Classification Search
None
See application file for complete search history.

(56) References Cited

U.S. PATENT DOCUMENTS

| | | |
|---|---|---|
| 2002/0098836 A1 | 7/2002 | Han et al. |
| 2008/0069047 A1 | 3/2008 | Yee et al. |

(Continued)

FOREIGN PATENT DOCUMENTS

| | | |
|---|---|---|
| CN | 1610427 A | 4/2005 |
| CN | 101374009 A | 2/2009 |

(Continued)

OTHER PUBLICATIONS

Extended European Search Report, dated Jun. 7, 2016, from corresponding European Application No. 14832697.

(Continued)

*Primary Examiner* — Diane Lo
(74) *Attorney, Agent, or Firm* — Wolf, Greenfield & Sacks, P.C.

(57) ABSTRACT

A communication mode switching method and device. The method comprises: receiving a sending request; detecting whether the radio-frequency signal strength of a downlink channel meets a first threshold; when the radio-frequency signal strength is greater than or equal to the first threshold, determining that a relay station is in a working state, and keeping a relaying mode to finish the sending request; when the radio-frequency signal strength is less than the first threshold, determining that the relay station is in an abnormal state, and switching to an offline mode to finish the sending request, the offline mode specifically being to perform sending after regulating the sending frequency to be the receiving frequency of the downlink channel. It can be seen that, whether the relay station is in the abnormal state is determined by detecting whether the signal strength of the downlink channel meets the preset threshold, and sequen- (Continued)

tially, the working mode is switched between the relaying mode and the offline mode in a targeted manner, so that when the relay station is in the abnormal state, the receiving frequency of the downlink channel is used as the sending frequency for sending signals, so as to ensure that other mobile stations are capable of receiving the sent signals, and the rate of call loss is lowered.

11 Claims, 6 Drawing Sheets

(51) Int. Cl.
*H04W 88/04* (2009.01)
*H04B 7/14* (2006.01)
*H04L 5/00* (2006.01)
*H04W 74/00* (2009.01)

(52) U.S. Cl.
CPC ......... *H04W 24/04* (2013.01); *H04W 72/042* (2013.01); *H04W 74/002* (2013.01); *H04W 88/04* (2013.01)

(56) References Cited

U.S. PATENT DOCUMENTS

| | | |
|---|---|---|
| 2009/0325480 A1 | 12/2009 | Ji et al. |
| 2010/0113060 A1 | 5/2010 | Bai et al. |
| 2012/0243454 A1* | 9/2012 | Hwang ............. H04W 52/0229 370/311 |
| 2013/0223257 A1* | 8/2013 | Balercia ............. H04B 7/15557 370/252 |

FOREIGN PATENT DOCUMENTS

| | | |
|---|---|---|
| CN | 101595682 A | 12/2009 |
| CN | 101730308 A | 6/2010 |
| CN | 102077482 A | 5/2011 |
| CN | 102215436 A | 10/2011 |
| CN | 103369609 A | 10/2013 |
| EP | 2 618 604 A1 | 9/2013 |
| JP | 2007089106 A | 4/2007 |

OTHER PUBLICATIONS

International Search Report, dated Sep. 28, 2014, from a corresponding International Application No. PCT/CN2014/082925.

* cited by examiner

COMMUNICATION MODE SWITCHING METHOD AND DEVICE

CROSS-REFERENCE TO THE RELATED APPLICATIONS

This application is a National Stage application of PCT international application PCT/CN2014/082925, filed on Jul. 24, 2014 which claims priority to Chinese Patent Application No. 201310324070.8, titled "COMMUNICATION MODE SWITCHING METHOD AND DEVICE" and filed with the Chinese State Intellectual Property Office on Jul. 29, 2013, both of which applications are incorporated herein by reference in their entireties.

FIELD

The present disclosure relates to the field of communication, and particularly to a communication mode switching method and a communication mode switching device.

BACKGROUND

In a case that a mobile station and a relay station operate in a mode of quickly activating the relay station, the relay station is in an abnormal state when no signal is relayed. In addition, the relay station is wake up to be in an operating state by receiving a signal from any one of mobile stations within coverage of a signal of the relay station. In this case, a time sequence of the relay station is synchronized with that of the mobile station, and then the relay station relays signals from the mobile station. In this way, a process of activating a base station is not required, and therefore a call admission time is greatly reduced.

In the conventional technology, the mobile station can not know a current state of the relay station in advance after acquiring a transmission request and performing a transmission. In the case that the relay station is in the abnormal state currently, the relay station can not forward the currently transmitted signals. The abnormal state includes a case that the relay station is in a hibernation state, or a case that a distance between the mobile station and the relay station is so far as to be close to or exceed a signal coverage scope thereof. When the relay station is in the hibernation state, the mobile station can not know whether the relay station can be switched from the hibernation state to the operating state successfully, to forward the transmitted signal, in response to the signal transmitted to the relay station. In the case that the distance between the mobile station and the relay station is too far, a signal transmitted by the mobile station can not be received by the relay station normally. Thus, the mobile station can not make sure whether the transmitted signal can be received and forwarded by the relay station. Thus, the case that the mobile station transmits the signal unsuccessfully or the signal transmitted by the mobile station lost may happen always. In other word, one mobile station transmits a signal. However, the transmitted signal can not be received by other mobile stations with coverage of the same relay station. Thus, a high loss probability has a poor influence on user experience.

SUMMARY

In order to solve the technical problem that the mobile station can not determine whether the transmitted signal can be received and forwarded by the relay station successfully, to result in the high loss probability described above, a communication mode switching method and a communication mode switching device are provided in the present disclosure.

Embodiments of the present disclosure provide a technical solution as follows.

A communication mode switching method is provided, including:
receiving a transmission request;
detecting whether radio frequency signal strength of a downlink channel meets a first threshold; and
determining that a relay station is in an operating state, and keeping a mobile station in a relay mode to complete a transmission request in a case that the radio frequency signal strength of the downlink channel is greater than or equal to the first threshold, where in the relay mode, a transmission is performed in a transmitting frequency of an uplink channel; and determining that a relay station is in an abnormal state and switching the mobile station into an offline mode to complete the transmission request, in a case that the radio frequency signal strength of the downlink channel is less than the first threshold, where in the offline mode, the transmitting frequency is adjusted to a receiving frequency of the downlink channel to perform the transmission.

Preferably, in a case that the radio frequency signal strength of the downlink channel is detected to be less than the first threshold, the communication mode switching method further includes:
transmitting an access request frame to the relay station and monitoring whether a relay signal is transmitted on the downlink channel;
determining that the relay station is in the operating state and keeping the mobile station in the relay mode to complete the transmission request, in a case that the relay signal is monitored; and
determining that the relay station is in the abnormal state and switching the mobile station into the offline mode to complete the transmission request, in a case that no relay signal is monitored.

Preferably, before the transmitting the access request frame to the relay station and monitoring whether the relay signal is transmitted on the downlink channel, the communication mode switching method further includes:
detecting whether signal strength of the uplink channel meets a second threshold; and
switching the mobile station into the offline mode to complete the transmission request, in a case that signal strength for accessing the uplink channel is greater than or equal to the second threshold; and
transmitting the access request frame to the relay station and monitoring whether the relay signal is transmitted on the downlink channel, in a case that the signal strength for accessing the uplink channel is less than the second threshold.

Preferably, in a case that the mobile station is switched into a keeping state in the offline mode, the communication mode switching method further includes:
detecting whether the radio frequency signal strength of the downlink channel meets the first threshold on reception of the transmission request; and
determining that the relay station is in the operating state and switching the mobile station into the relay mode to complete the transmission request, in a case that the radio frequency signal strength of the downlink channel is greater than or equal to the first threshold; or determining that the relay station is in the abnormal state and keeping the communication mode in the offline mode to complete the transmission request, in a case that the radio frequency signal strength of the downlink channel is less than the first threshold.

Preferably, in a case that the mobile station is switched into a keeping state in the offline mode, the communication mode switching method further includes:
performing a call admission, in a case that a call request for the mobile station is received;
determining whether an end frame of the call request is a relay signal on reception of the end frame;
switching the communication mode into the relay mode in a case that the end frame is the relay signal; and
keeping the mobile station in the offline mode and switching the mobile station into the keeping state, in a case that the end frame is not the relay signal.

Preferably, in a case that the relay station is switched into a keeping state in the offline mode, the communication mode switching method further includes:
switching the mobile station into the relay mode in a case that no operation is performed in a period from an activation of a keeping timer to an expiration of the keeping timer.

A communication mode switching device is provided, which includes:
a transmission request receiving unit configured to receive a transmission request;
a first threshold detecting unit configured to detect whether radio frequency signal strength of a downlink channel meets a first threshold; and
a relay mode keeping unit configured to determine that a relay station is in an operating state, and to keep in a relay mode to complete the transmission request, in a case that the first threshold detecting unit detects that the radio frequency signal strength of the downlink channel is greater than or equal to the first threshold, where in the relay mode, a transmission is performed in a transmitting frequency of an uplink channel;
an offline mode switching unit configured to determine that a relay station is in an abnormal state, and to switch to an offline mode to complete the transmission request, in a case that the first threshold detecting unit detects that the radio frequency signal strength of the downlink channel is less than the first threshold, where in the offline mode, a transmitting frequency is adjusted to a receiving frequency of the downlink channel to perform a transmission.

Preferably, the communication mode switching device further includes:
a downlink channel monitoring unit configured to transmit an access request frame to the relay station and monitor whether a relay signal is transmitted on the downlink channel, in a case that the first threshold detecting unit detects that the radio frequency signal strength of the downlink channel is less than the first threshold; and
where the relay mode keeping unit is further configured to determine that the relay station is in the operating state and keep in the relay mode to complete the transmission request, in a case that the relay signal is monitored by the downlink channel monitoring unit; and the offline mode switching unit is further configured to determine that the relay station is in the abnormal state and switch to the offline mode to complete the transmission request, in a case that no relay signal is monitored by the downlink channel monitoring unit.

Preferably, the communication mode switching device further includes:
an uplink channel detecting unit configured to detect whether signal strength of the uplink channel meets a second threshold before the downlink channel monitoring unit is activated; and where the offline mode switching unit is further configured to switch to the offline mode to complete the transmission request in a case that the uplink channel detecting unit detects that signal strength for accessing the uplink channel is greater than or equal to the second threshold; and
the downlink channel monitoring unit is further configured to transmit the access request frame to the relay station and monitor whether the relay signal is transmitted on the downlink channel, in a case that the uplink channel detecting unit detects that the signal strength for accessing the uplink channel is less than the second threshold.

Preferably, the first threshold detecting unit is further configured to, in a case that the offline mode switching unit is switched into a keeping state after the transmission request is completed, detect whether the radio frequency signal strength of the downlink channel meets the first threshold on reception of the transmission request;
a relay mode switching unit is configured to determine that the relay station is in the operating state and switch to the relay mode to complete the transmission request, in a case that the first threshold detecting unit detects that the radio frequency signal strength of the downlink channel is greater than or equal to the first threshold; and
an offline mode keeping unit is configured to determine that the relay station is in the abnormal state and keep in the offline mode to complete the transmission request, in a case that the first threshold detecting unit detects that the radio frequency signal strength of the downlink channel is less than the first threshold.

Preferably, the communication mode switching device further includes:
a call admission unit configured to perform a call admission when a call request for a mobile station is received, in a case that the offline mode switching unit is switched into a keeping state after the transmission request is completed; and
an end frame determining unit configured to determine whether an end frame of the call request is a relay signal on reception of the end frame;
where the relay mode switching unit is further configured to switch into the relay mode in a case that the end frame determining unit determines that the end frame is the relay signal; and
the offline mode keeping unit is further configured to keep in the offline mode and switch into the keeping state in a case that the end frame determining unit determines that the end frame is not the relay signal.

In the technical solution described above, the relay station in the abnormal state is determined by detecting whether the signal strength of the downlink channel meets the preset threshold, and the operating mode is switched between the relay mode and the offline mode in a targeted manner. In this way, the receiving frequency of the downlink channel is used as the transmitting frequency to transmit a signal when the relay station is in the abnormal state, thereby ensuring that the transmitted signal can be received by other mobile stations, and reducing the loss probability.

BRIEF DESCRIPTION OF THE DRAWINGS

In order to more clearly illustrate the technical solution in the embodiments of the present disclosure or in the conventional technology, in the following, drawings required in the description of the embodiments or the conventional technology will be introduced simply. Obviously, the drawings in the following description are just some embodiments of the disclosure. For those skilled in the art, other drawings can also be obtained according to the drawings without any creative work.

DETAILED DESCRIPTION OF EMBODIMENTS

A communication mode switching method and a communication mode switching device are provided in embodiments of the present disclosure. First, the relay station in the abnormal state is determined by detecting whether the signal strength of the downlink channel meets the preset threshold, and the operating mode of the mobile station is switched between the relay mode and the offline mode in a targeted manner. In this way, the receiving frequency of the downlink channel is used as the transmitting frequency to transmit a signal when the relay station is in the abnormal state, thereby ensuring that the transmitted signal can be received by other mobile stations, and reducing the loss probability.

Then, in a case that it is detected that the signal strength of the downlink channel is less than the preset threshold, the signal strength of the uplink channel is further determined. It is determined that signal interference occurs in the uplink channel in a case that the signal strength of the uplink channel is too strong. In this case, since a probability of the relay station successfully receiving a signal on the uplink channel is low, a current operating mode is switched to be the offline mode, thereby raising a call success ratio. In a case that the signal strength of the uplink channel is normal, the relay signal on the downlink channel is monitored after the access request frame is transmitted on the uplink channel. In this way, it is determined whether the relay station in the abnormal state currently is awaken to be in the operating state, thereby further raising the call success ratio.

Finally, in a case that the mobile station is in the offline mode, the case of continuing transmitting or receiving the call request from other mobile stations is analyzed. The mobile station is switched into the relay mode, or switched into the relay mode after the transmission is completed in the offline mode, if it is determined that the relay station is recovered in the operating state. The transmission coverage area is extended as far as possible in a case of ensuring the call success ratio.

In order to make the objects, the features or the advantages of the present disclosure described above clearer and easier to understand, the embodiments of the present disclosure are described below in detail below in conjunction with the drawings.

First Embodiment

Figure 1:
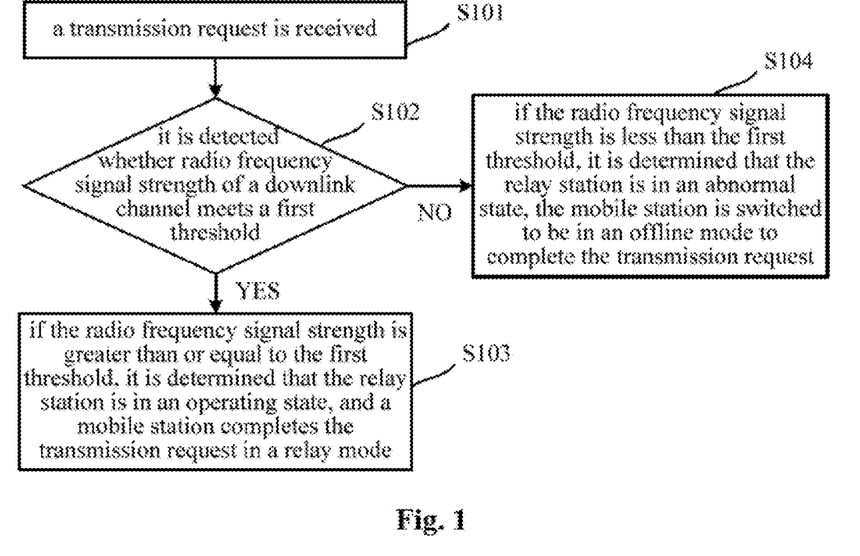
FIG. 1 is a flow diagram of a communication mode switching method according to an embodiment of the present disclosure.

With reference to FIG. 1, a flow diagram of a communication mode switching method is shown according to the present disclosure. The communication mode switching method includes S101 to S104.

In S101, a transmission request is received.

The transmission request may be a request triggered by an action of a user, such as pressing a talk key of a mobile station or invoking a menu to edit a short message. That is, the transmission request at least includes a voice-type transmission request, and a text-type or signaling-type transmission request.

In S102, it is detected whether radio frequency signal strength of a downlink channel meets a first threshold.

As long as a relay station is in an operating state, a certain strength of carrier signal can at least be received on a downlink channel of a mobile station within a coverage area of a signal of the relay station, regardless of whether the relay station forwards signals from other mobile stations. This is served as a basis of effectively determining the currently state of the relay station. The mobile station determines a current operating state of the relay station by comparing the received radio frequency signal strength of the downlink channel with the first threshold preset. Steps S103 and S104 described below provide operations corresponding to different comparison results. Step S103 is performed in a case that the comparison result is that the radio frequency signal strength is greater than or equal to the first threshold. Step S104 is performed in a case that the comparison result is that the radio frequency signal strength is less than the first threshold.

Practically, a mode of rapidly activating the relay station and two different operating modes of the mobile station are explained, before the operations corresponding to the different comparison results are introduced. The mode of rapidly activating the relay station is a manner of establishing a time sequence relation by the mobile station in a communication process with a base station. That is, in a communication process with a base station, in the case that the base station does not perform the transmission, it is also possible to have base stations that are able to transmit their outbound channel in a way that is synchronized with an MS inbound channel, thereby avoiding a base station activation procedure. In this way, the base station can ensure all mobile stations operate based on the same timing base.

In the mode of rapidly activating the relay station, the mobile station establishes the time sequence relation in a relay mode. When the mobile station and the relay station operate in the mode of rapidly activating the relay station and the relay station is in an operating state, the mobile station can be in the relay mode, i.e., a normal transmitting way, in which a transmitting frequency of the uplink channel is used to transmit. It should be noted here that the transmitting frequency and a receiving frequency of the mobile station are set to be different in the relay mode. When it is detected that the relay station is in a hibernation mode or the mobile station is far away from the relay station, the mobile station may be switched to an offline mode from the relay mode. That is, the mobile station uses a receiving frequency of a downlink channel thereof as the transmitting frequency to transmit a signal within a coverage area of a signal of the mobile station, without a relay of the relay station. In this way, the signal transmitted by the mobile station can be received by all other mobile stations within the coverage area of the signal of the mobile station. Although a coverage area of the transmitted signal in this mode is smaller than the coverage area of the signal of the relay station, it at least can be ensured that the transmitted signal can be received by all other mobile stations in the coverage area of the transmitted signal, and therefore a problem that all other stations can not receive the transmitted signal because that the relay station does not relay the transmitted signal in the hibernation mode is avoided.

In S103, in a case that the radio frequency signal strength of the downlink channel is greater than or equal to the first threshold, it is determined that the relay station is in an operating state, and a mobile station keeps in a relay mode to complete the transmission request. Specifically, in the relay mode, a transmission is performed in a transmitting frequency of the uplink channel.

In S104, in a case that the radio frequency signal strength of the downlink channel is less than the first threshold, it is determined that the relay station is in an abnormal state, the mobile station is switched to be in an offline mode to complete the transmission request. Specifically, in the offline mode, a transmitting frequency is adjusted to a receiving frequency of the downlink channel to perform the transmission.

When the mobile station performs the transmission in the offline mode, the signal transmitted by the mobile station can be received by other mobile stations within a coverage area of a signal of the mobile station. Practically, the relay station in the abnormal state currently can be activated by receiving a signal from any mobile station, to wake up the relay station to be in the operating state. However, a precondition for reactivating the relay station is a case that the relay station successfully receives a signal transmitted by a mobile station. Therefore, when the relay station is determined in the abnormal state, it is preferable to try to activate the relay station. Specifically, with reference to FIG. 2, a flow diagram of communication mode switching method is shown according to another embodiment of the present disclosure. In the case that the radio frequency signal strength of the downlink channel is less than the first threshold, the communication mode switching method further includes S201 to S203.

Figure 2:
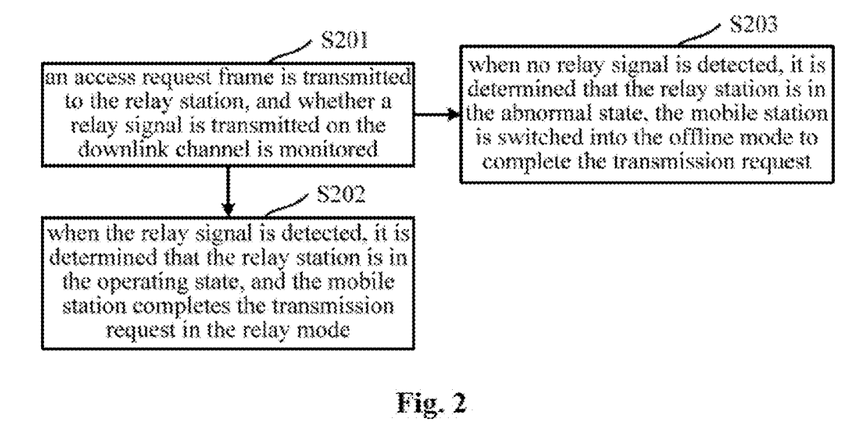
FIG. 2 is a flow diagram of a communication mode switching method according to another embodiment of the present disclosure.

In S201, an access request frame is transmitted to the relay station, and whether a relay signal is transmitted on the downlink channel is monitored.

In S202, in a case that the relay signal is detected, it is determined that the relay station is in the operating state, and the mobile station keeps in the relay mode to complete the transmission request.

In S203, in a case that no relay signal is detected, it is determined that the relay station is in the abnormal state, the mobile station is switched into the offline mode to complete the transmission request.

The abnormal state here at least includes two cases. In one case, the relay station is in the hibernation state; and in another case, a distance between the mobile station and the relay station is so far as to be close to or exceed a signal coverage scope thereof.

That is, the access request frame is sent to try to activate the relay station in the abnormal state, and the size of the access request frame is generally one frame to two frames.

Practically, different types of transmission signals correspond to different access request frames. An access request frame having a voice frame header is used for a transmission request for a voice signal. An access request frame in a pre-carrier manner is used for a transmission request in a text or signaling manner. These access request frames have a same function, i.e., trying to send the signal to the relay station and activating the relay station to be in the operating state. Generally, the access request frame can be sent many times. The number of sending the access request frame is determined based on a preset value. After the access request frame is transmitted, the mobile station will monitor whether a relay signal for the relay station relaying the access request frame or any other relay signal is received on the downlink channel in a next time slot of sending the access request frame. In the case that the relay signal is monitored, it indicates that the relay station is activated to be in the operating state by the sent access request frame or a signal transmitted by other mobile stations. In this case, it is not required to continue sending the access request frame, a transmission operation is performed in the current relay mode. It should be noted that, a special case may result in that no relay signal is received in the downlink channel after the access request frame is transmitted. In the special case, multiple mobile stations perform an operation on the relay station, such as sending an access request frame or transmitting a signal to the relay station, on the uplink channel at the same time or almost at the same time. In this case, none of the multiple mobile stations can transmit the signal to the relay station successfully. For this possible case, if the number of sending the access request frame is not less than a set number, a time for sending the access request frame next time is adjusted, for example, by randomly delaying the time by 60 ms or 120 ms. Therefore, the above case of a collision among the signals sent by the multiple mobile stations is avoided. This operation is called as random back-off retransmission. In the case that the number of sending the access request frame reaches the set number and no relay signal or carrier is monitored on the downlink channel, it is determined that the signal transmitted by the mobile station can not be detected by the relay station on the uplink channel due to some reason, and the mobile station can not activate the relay station in the abnormal state. In this case, the mobile station is switched to be in the offline mode to perform transmission.

Figure 3:
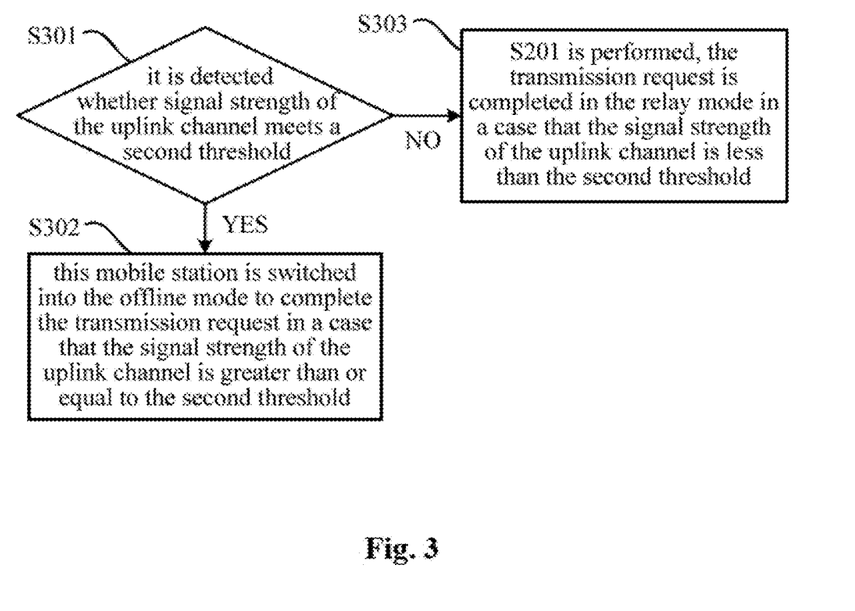
FIG. 3 is a flow diagram of a communication mode switching method according to another embodiment of the present disclosure.

It should also be noted that, before trying to activate the relay station, it is preferable to detect whether other signal interference occurs in the uplink channel. Even if the uplink channel is normally used to transmit the signal, the relay station is not activated successfully due to some cases, for example, other mobile stations make a call in the same frequency as the uplink channel. In this case, even if the mobile station sends the channel access request frame to the relay station on the uplink channel, the signal from the mobile station can not be detected by the relay station due to the interference on the uplink channel, and thus the relay station can not be activated. For the cases described above, a way as follows is used in the present disclosure, to detect whether the uplink channel is in a normal usable state.

In S301, it is detected whether signal strength of the uplink channel meets a second threshold.

Step 302 is performed in the case that the signal strength of the uplink channel is greater than or equal to the second threshold.

Step 303 is performed in the case that the signal strength of the uplink channel is less than the second threshold.

In S302, this mobile station is switched into the offline mode to complete the transmission request.

When the detected signal strength of the uplink channel is too strong, it is determined that the uplink channel is disturbed. In this case, if the signal is still transmitted on the uplink channel, there is hardly any probability of the relay station successfully receiving and forwarding the transmitted signal. Therefore, the mobile station is switched to be the offline mode to perform the transmission operation.

In S303, step S201 is performed on the uplink channel, the transmission request is transmitted in the relay mode.

In the embodiment, first, the relay station in the abnormal state is determined by detecting whether the signal strength of the downlink channel meets the preset threshold, and the operating mode is switched between the relay mode and the offline mode in a targeted manner. In this way, the receiving frequency of the downlink channel is used as the transmitting frequency to transmit a signal when the relay station is in the abnormal state, thereby ensuring that the transmitted signal can be received by other mobile stations, and reducing the loss probability.

Then, in the case that it is detected that the signal strength of the downlink channel is less than the preset threshold, the signal strength of the uplink channel is further determined. It is determined that signal interference occurs in the uplink channel when the signal strength of the uplink channel is too strong. In this case, since a probability of the relay station successfully receiving a signal transmitted on the uplink channel is low, a current operating mode is switched to be the offline mode, thereby raising the loss probability. When the signal strength of the uplink channel is normal, the access request frame is transmitted on the uplink channel, and the relay signal is monitored on the downlink channel. In this way, it is determined whether the relay station in the abnormal state currently is wake up to be in the operating state, thereby further raising the loss probability.

Second Embodiment

Figure 4:
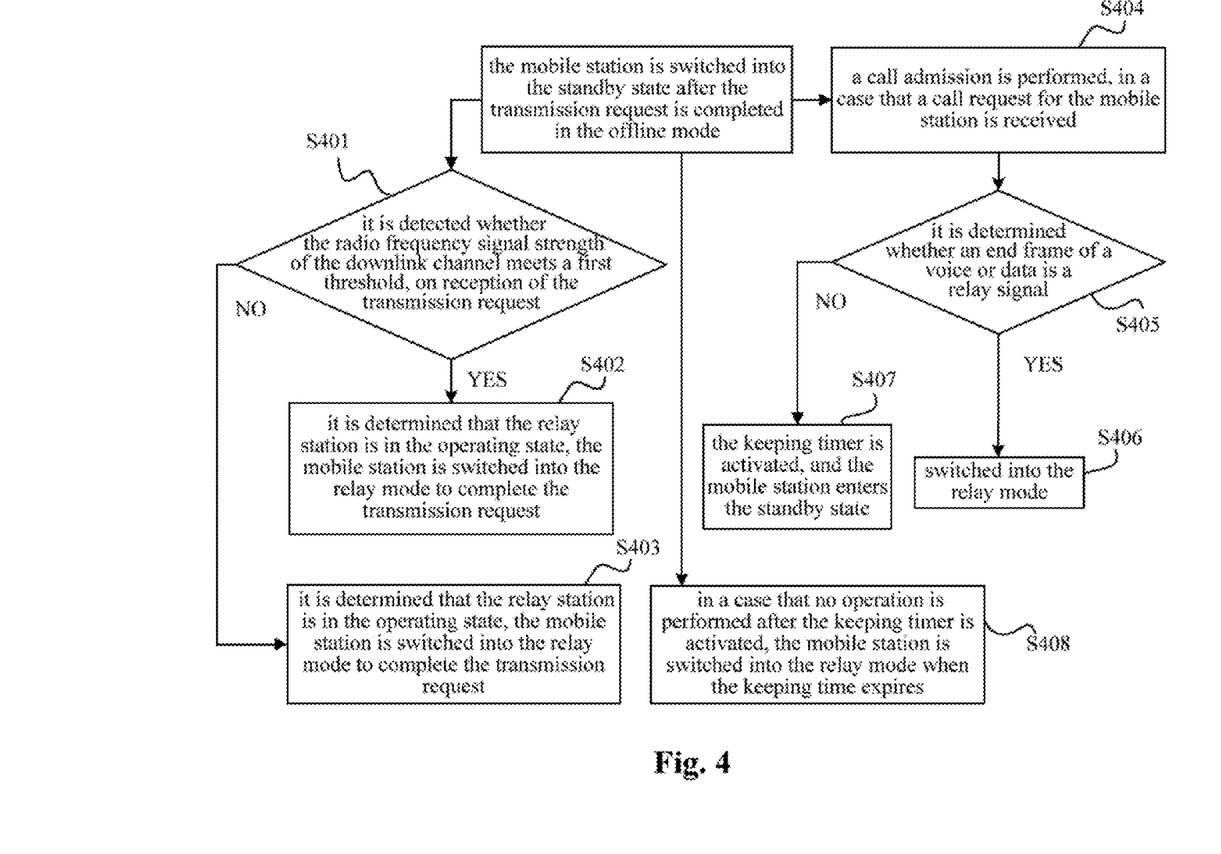
FIG. 4 is a flow diagram of a communication mode switching method according to another embodiment of the present disclosure.

Based on the first embodiment, a process of switching the mobile station from the offline mode to the relay mode is described in the embodiment. With reference to FIG. 4, a flow diagram of a communication mode switching method is shown according to another embodiment of the present disclosure. After the transmission request is completed in the offline mode, the communication mode switching method further includes a technical solution as follows.

A process of switching into the keeping state after the transmission request is completed in the offline mode, and the keeping mode is introduced before the technical solution is introduced.

Generally, a system may set a keeping time period. Thus, a mobile station which has just ended a call may rapidly establish a new call in the keeping time period, and a mobile station which has received the text or the signaling may rapidly make a response to the text or the signaling sent by the other mobile station in the keeping time period. The keeping time period is set by the system in advance, different keeping time periods can be set for different types of transmission signals. In the case that a voice-type signal is transmitted, the keeping time period is a call holding time, in which the uplink channel is hold by the mobile station which has transmitted the signal. When continuing transmitting a signal in the keeping time period, the mobile station can directly use the uplink channel without detecting or waiting. In a case that a text-type signal or a signaling-type signal is transmitted, the keeping time period is a response waiting time. The mobile station, receiving the text or the signaling, may transmit a response signal to a mobile station, transmitting the text or the signaling, in the response waiting time. A function of the response waiting time is similar to that of the call holding time.

In the keeping time period, the mobile station will keep a right to use the channel for transmitting the signal. It also should be noted that, different timers are used for different types of transmission operations for the signal. When a voice-type call signal is transmitted just now, a voice call keeping timer is activated, and a call keeping state is entered. When text data or a signaling-type signal is transmitted just now, a response waiting timer is activated, and a response waiting state is entered. An application background in the embodiment is that the transmission request is completed in the offline mode. Thus, when the mobile station is switched into the keeping state, an operating mode of the mobile station is still in the offline mode. Many possible operations may occur in the keeping state. For example, the mobile station continues receiving a transmission request or receiving calls from other mobile stations. Some regular cases may be introduced below.

In the case that the mobile station is switched into the keeping state after the transmission request is completed in the offline mode, the communication mode switching method includes step S401 to S403.

In S401, it is detected whether the radio frequency signal strength of the downlink channel meets a first threshold, on reception of the transmission request.

S402 is performed in a case that the radio frequency signal strength of the downlink channel is greater than or equal to the first threshold.

S403 is performed in a case that the radio frequency signal strength of the downlink channel is less than the first threshold.

In S402, it is determined that the relay station is in the operating state, a keeping timer is stopped, and the mobile station is switched into the relay mode to complete the transmission request.

In S403, it is determined that the relay station is in the abnormal state, the keeping timer is stopped, and the mobile station keeps in the offline mode to complete the transmission request.

After a transmission request of a user is received to the mobile station again, the radio frequency signal strength of the downlink channel is detected firstly, and corresponding steps are performed subsequently based on different cases. The mobile station is in the offline mode currently, this embodiment differs from the first embodiment, in that the transmission request is received in the call keeping time period of the offline mode, and the radio frequency signal strength of the downlink channel is still served as a determination basis. Practically, since the mobile station is in the offline mode currently, the mobile station is switched into the relay mode in a case that the relay station is determined in the operating state, and the mobile station keeps in the offline mode in a case that the relay station is determined in the abnormal state, to complete the transmission request.

Alternatively, the communication mode switching method may include step S404 to S407.

In S404, the keeping timer is stopped and a call admission is started, in a case that a call request for the mobile station is received.

In S405, when an end frame of a call for calling the mobile station is received, it is determined whether the end frame is a relay signal; S406 is performed in a case that the end frame is the relay signal; and S407 is performed in a case that the end frame is not the relay signal.

In S406, the mobile station is switched into the relay mode.

In S407, the keeping timer is activated, and the mobile station enters the keeping state.

In this embodiment, the mobile station in the call keeping state of the offline mode receives a call request from the other mobile station to this mobile station. When it is determined that the call request is relayed by the relay station, instead of switching into the relay mode immediately, the mobile station continues receiving the call until the end frame (practically, considering a type of the call, the end frame includes a voice end frame or a data end frame) of the call is detected, to indicate that this call is ended, and then the mobile station is switched into the relay mode. In this way, it is avoided that voice or data is lost because the received call is disconnected first and then connected. If the call request for this mobile station is not a signal relayed by the relay station, the mobile station is always in the offline mode within a time period from the call admission to the end of the call.

Alternatively, the communication mode switching method may include step S408. In S408, in a case that no operation is performed after the keeping timer is activated, the mobile station is switched into the relay mode when the keeping time expires.

That is, after the keeping timer is activated, the mobile station does not receive any call. In this case, the mobile station can be switched into the relay mode only when the keeping timer expires.

In the case that the mobile station still remains in the offline mode and the call keeping state after determining the cases described above, and no operation is performed, the keeping timer countdowns to zero or expire. In this case, the mobile station may not stay in the offline mode, be switched into the relay mode, and wait for a next user operation.

In the embodiment, in a case that the mobile station is in the offline mode, the case that the mobile station continues transmitting or receiving the call request from other mobile stations is analyzed. The mobile station is switched into the relay mode in the case that the relay station is determined to be recovered in the operating state, or after the mobile station completes the transmission in the offline mode. Thus, the transmission area is extended as far as possible in a case of ensuring the call success ratio.

Third Embodiment

Figure 5:
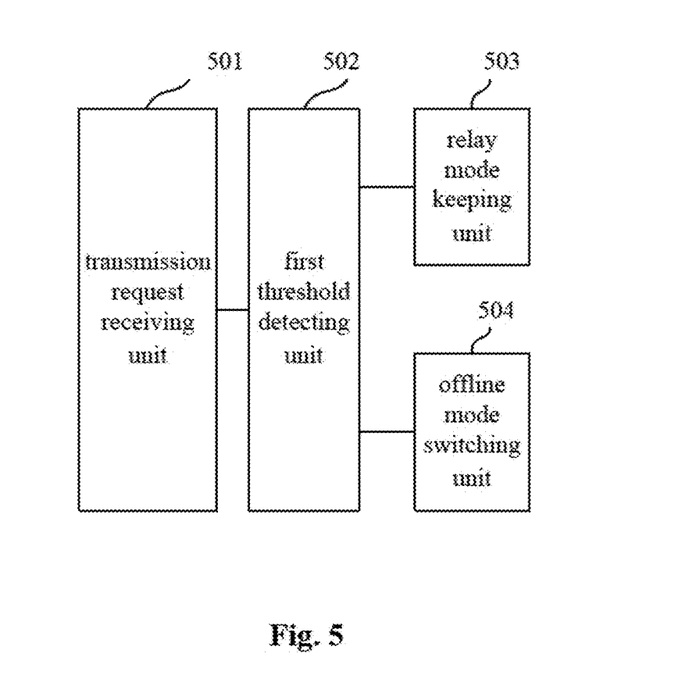
FIG. 5 is a structural diagram of a communication mode switching device according to an embodiment of the present disclosure.

Corresponding to the communication mode switching method described above, a communication mode switching device is further provided in an embodiment of the present disclosure. With reference to FIG. 5, a structural diagram of a communication mode switching device is shown according to the present disclosure. The communication mode switching device includes a transmission request receiving unit 501, a first threshold detecting unit 502, a relay mode keeping unit 503 and an offline mode switching unit 504.

The transmission request receiving unit 501 is configured to receive a transmission request.

The first threshold detecting unit 502 is configured to detect whether radio frequency signal strength of a downlink channel meets a first threshold.

The relay mode keeping unit 503 is configured to determine that a relay station is in an operating state, and to keep a mobile station in a relay mode to complete the transmission request, in a case that the first threshold detecting unit 502 detects that the radio frequency signal strength of the downlink channel is greater than or equal to the first threshold. In the relay mode, a transmission is performed in a transmitting frequency of an uplink channel.

The offline mode switching unit 504 is configured to determine that the relay station is in an abnormal state, and to switch the mobile station into an offline mode to complete the transmission request, in a case that the first threshold detecting unit 502 detects that the radio frequency signal strength of the downlink channel is less than the first threshold. In the offline mode, a transmitting frequency is adjusted to a receiving frequency of the downlink channel to perform a transmission.

Figure 6:
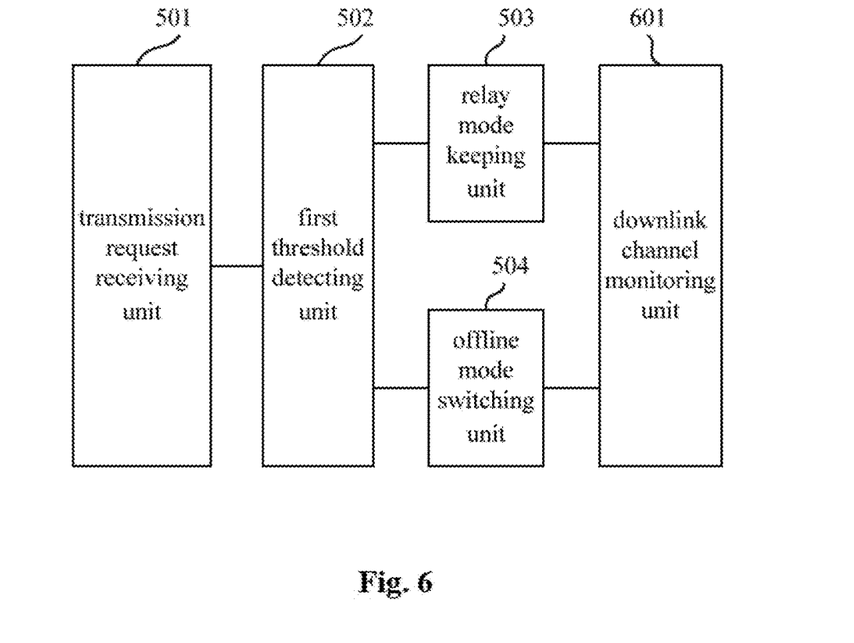
FIG. 6 is a structural diagram of a communication mode switching device according to an embodiment of the present disclosure.

Preferably, the communication mode switching device shown in FIG. 5 described above further includes a downlink channel monitoring unit 601, as shown in FIG. 6.

The downlink channel monitoring unit 601 is configured to transmit an access request frame to the relay station and monitor whether a relay signal is transmitted on the downlink channel, in a case that the first threshold detecting unit 502 detects that the radio frequency signal strength of the downlink channel is less than the first threshold.

The relay mode keeping unit 503 is further configured to determine that the relay station is in the operating state and keep the mobile station in the relay mode to complete the transmission request, in a case that the relay signal is monitored by the downlink channel monitoring unit.

The offline mode switching unit 504 is further configured to determine that the relay station is in the abnormal state and switch the mobile station into the offline mode to complete the transmission request in a case that no relay signal is monitored by the downlink channel monitoring unit.

Figure 7:
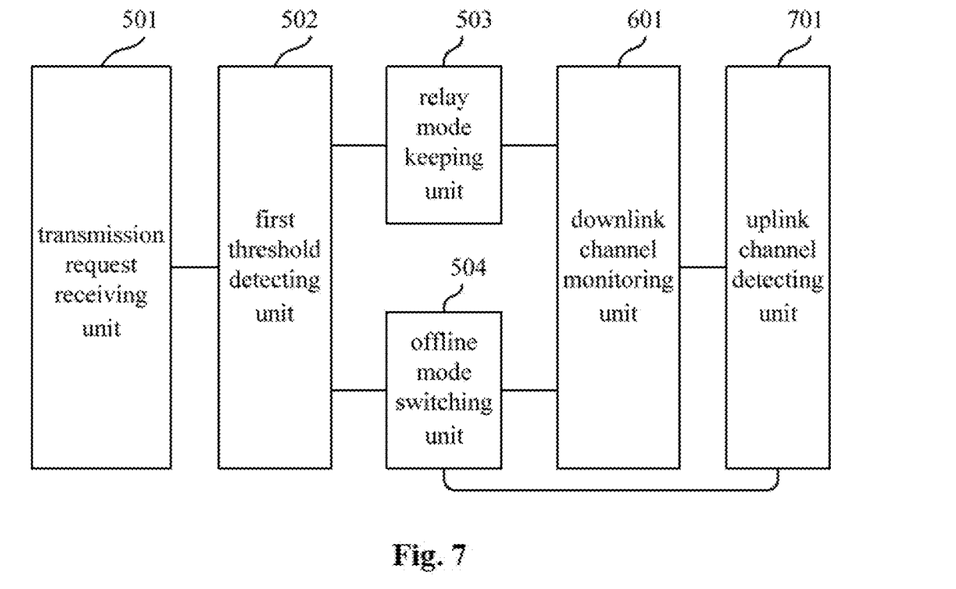
FIG. 7 is a structural diagram of a communication mode switching device according to another embodiment of the present disclosure.

Preferably, the communication mode switching device shown in FIG. 6 described above further includes an uplink channel detecting unit 701, as shown in FIG. 7.

The uplink channel detecting unit 701 is configured to detect whether signal strength of the uplink channel meets a second threshold before the downlink channel monitoring unit is activated.

The offline mode switching unit 504 is further configured to switch the mobile station into the offline mode to complete the transmission request in a case that the uplink channel detecting unit 701 detects that signal strength for accessing the uplink channel is greater than or equal to the second threshold.

The downlink channel monitoring unit 601 is further configured to transmit the access request frame to the relay station and monitor whether the relay signal is transmitted on the downlink channel, in a case that the uplink channel detecting unit 701 detects that the signal strength for accessing the uplink channel is less than the second threshold.

In the embodiment, first, whether the relay station in the abnormal state is determined by detecting whether the signal strength of the downlink channel meets the preset threshold, and the operating mode is switched between the relay mode and the offline mode in a targeted manner. In this way, the receiving frequency of the downlink channel is used as the transmitting frequency to transmit a signal in the case that the relay station is in the abnormal state, thereby ensuring that the transmitted signal can be received by other mobile stations, and reducing the loss probability.

Then, in the case that it is detected that the signal strength of the downlink channel is less than the preset threshold, the signal strength of the uplink channel is further determined. It is determined that signal interference occurs in the uplink channel in a case that the signal strength of the uplink channel is too strong. In this case, since a probability of the relay station successfully receiving a signal on the uplink channel is low, a current operating mode is switched to be the offline mode, thereby raising a call success ratio. In a case that the signal strength of the uplink channel is normal, the relay signal on the downlink channel is monitored after the access request frame is transmitted on the uplink channel. In this way, it is determined whether the relay station in the abnormal state currently is awaken to be in the operating state, thereby further raising the call success ratio.

Fourth Embodiment

Figure 8:
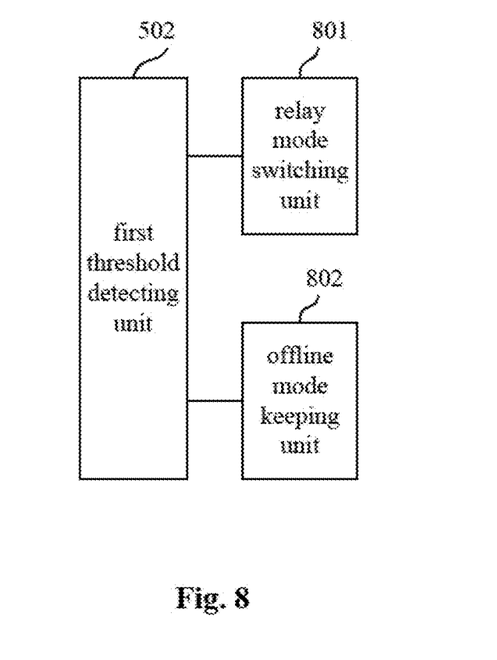
FIG. 8 is a structural diagram of a communication mode switching device according to another embodiment of the present disclosure.

Based on the third embodiment, a method for switching the mobile station from the offline mode to the relay mode is described in the embodiment. With reference to FIG. 8, a structural diagram of a communication mode switching device is shown according to another embodiment of the present disclosure. The communication mode switching device includes the first threshold detecting unit 502, a relay mode switching unit 801 and an offline mode keeping unit 802.

The first threshold detecting unit 502 is further configured to, in a case that the offline mode switching unit 504 is switched into a keeping state after the transmission request is completed, detect whether the radio frequency signal strength of the downlink channel meets the first threshold when the transmission request is received.

The relay mode switching unit 801 is configured to determine that the relay station is in the operating state and switch the mobile station to the relay mode to complete the transmission request, in a case that the first threshold detecting unit 502 detects that the radio frequency signal strength of the downlink channel is greater than or equal to the first threshold.

The offline mode keeping unit 802 is configured to determine that the relay station is in the abnormal state and keep the mobile station in the offline mode to complete the transmission request, in a case that the first threshold detecting unit 502 detects that the radio frequency signal strength of the downlink channel is less than the first threshold.

Fifth Embodiment

Figure 9:
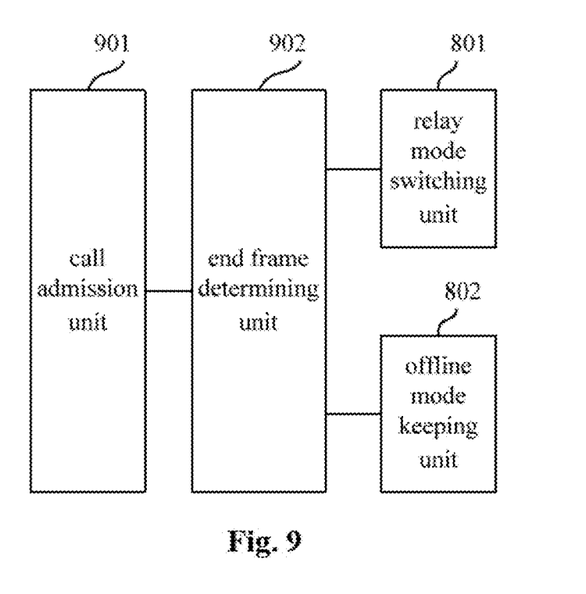
FIG. 9 is a structural diagram of a communication mode switching device according to another embodiment of the present disclosure.

Based on the third embodiment, a method for switching the mobile station from the offline mode to the relay mode is described in the embodiment. With reference to FIG. 9, a structural diagram of a communication mode switching device is shown according to another embodiment of the present disclosure. The communication mode switching device includes a call admission unit 901, an end frame determining unit 902, the relay mode switching unit 801 and the offline mode keeping unit 802.

The call admission unit 901 is configured to, perform a call admission when a call request for a mobile station is received, in a case that the offline mode switching unit 504 is switched into a keeping state after the transmission request is completed.

The end frame determining unit 902 is configured to determine whether an end frame of the call request is a relay signal on reception of the end frame.

The relay mode switching unit 801 is further configured to be switched into the relay mode in a case that the end frame determining unit determines that the end frame is the relay signal.

The offline mode keeping unit 802 is further configured to keep in the offline mode and switch into the keeping state in a case that the end frame determining unit determines that the end frame is not the relay signal.

In the embodiment, in the case that the mobile station is in the offline mode, a case of continuing transmitting or receiving the call request from other mobile stations is analyzed. The mobile station is switched into the relay mode, or switched into the relay mode after the transmission is completed in the offline mode, if it is determined that the relay station is recovered in the operating state. The transmission coverage area is extended as far as possible in a case of ensuring the call success ratio.

It should be illustrated that, those skilled in the art should understand that all or a part of flow in the communication mode switching method according to the embodiments described above can be implemented in a way of instructing related hardware by a computer program, the program can be stored in a computer readable storage medium, the program can include the flow of each of methods according to the embodiments described above when being executing. Specifically, the storage medium may be a magnetic disk, an optical disk, a read-only memory (Read-Only Memory, ROM) or a random access memory (Random Access Memory, RAM) or the like.

The communication mode switching method and device according to the embodiments of the present disclosure are described in detail above, a principle and embodiments of the present disclosure are described in the specification by a specific example, the embodiments described above are only intended to facilitate understanding the method and core concept of the present disclosure; also, changes can be made onto the embodiments and an application scope by those skilled in the art based on the concept of the present disclosure, as above, the specification is not understood to limit the present disclosure.

The invention claimed is:

1. A communication mode switching method, comprising:
receiving a transmission request;
detecting whether radio frequency signal strength of a downlink channel meets a first threshold; and
determining that a relay station is in an operating state, and keeping a mobile station in a relay mode to complete a transmission request, in a case that the radio frequency signal strength of the downlink channel is greater than or equal to the first threshold, wherein in the relay mode, a transmission is performed in a transmitting frequency of an uplink channel; and
determining that the relay station is in an abnormal state and switching the mobile station into an offline mode to complete the transmission request, in a case that the radio frequency signal strength of the downlink channel is less than the first threshold, wherein in the offline mode, the transmitting frequency is adjusted to a receiving frequency of the downlink channel to perform the transmission.

2. The communication mode switching method according to claim 1, wherein in a case that the radio frequency signal strength of the downlink channel is detected to be less than the first threshold, the communication mode switching method further comprises:
transmitting an access request frame to the relay station and monitoring whether a relay signal is transmitted on the downlink channel;
determining that the relay station is in the operating state and keeping the mobile station in the relay mode to complete the transmission request, in a case that the relay signal is detected; and determining that the relay station is in the abnormal state and switching the mobile station into the offline mode to complete the transmission request, in a case that no relay signal is detected.

3. The communication mode switching method according to claim 2, wherein before the transmitting the access request frame to the relay station and monitoring whether the relay signal is transmitted on the downlink channel, the communication mode switching method further comprises:
   detecting whether signal strength of the uplink channel meets a second threshold;
   switching the mobile station into the offline mode to complete the transmission request, in a case that signal strength for accessing the uplink channel is greater than or equal to the second threshold; and
   transmitting the access request frame to the relay station and monitoring whether the relay signal is transmitted on the downlink channel in a case that the signal strength for accessing the uplink channel is less than the second threshold.

4. The communication mode switching method according to claim 1, wherein in a case that the mobile station is switched into a keeping state in the offline mode, the communication mode switching method further comprises:
   detecting whether the radio frequency signal strength of the downlink channel meets the first threshold on reception of the transmission request;
   determining that the relay station is in the operating state and switching the mobile station into the relay mode to complete the transmission request, in a case that the radio frequency signal strength of the downlink channel is greater than or equal to the first threshold; and
   determining that the relay station is in the abnormal state and keeping the mobile station in the offline mode to complete the transmission request, in a case that the radio frequency signal strength of the downlink channel is less than the first threshold.

5. The communication mode switching method according to claim 1, wherein in a case that the mobile station is switched into a keeping state in the offline mode, the communication mode switching method further comprises:
   performing a call admission, in a case that a call request for the mobile station is received;
   determining whether an end frame of the call request is a relay signal on reception of the end frame;
   switching the mobile station into the relay mode in a case that the end frame is the relay signal; and
   keeping the mobile station in the offline mode and switching the mobile station into the keeping state, in a case that the end frame is not the relay signal.

6. The communication mode switching method according to claim 1, wherein in a case that the mobile station is switched into a keeping state in the offline mode, the communication mode switching method further comprises:
   switching the mobile station into the relay mode, in a case that no operation is performed in a period from an activation of a keeping timer to an expiration of the keeping timer.

7. A communication mode switching device, comprising:
   a transmission request receiving unit configured to receive a transmission request;
   a first threshold detecting unit configured to detect whether radio frequency signal strength of a downlink channel meets a first threshold;
   a relay mode keeping unit configured to determine that a relay station is in an operating state, and to keep in a relay mode to complete the transmission request, in a case that the first threshold detecting unit detects that the radio frequency signal strength of the downlink channel is greater than or equal to the first threshold, wherein in the relay mode, a transmission is performed in a transmitting frequency of an uplink channel; and
   an offline mode switching unit configured to determine that the relay station is in an abnormal state, and to switch to an offline mode to complete the transmission request, in a case that the first threshold detecting unit detects that the radio frequency signal strength of the downlink channel is less than the first threshold, wherein in the offline mode, a transmitting frequency is adjusted to a receiving frequency of the downlink channel to perform a transmission.

8. The communication mode switching device according to claim 7, further comprising:
   a downlink channel monitoring unit configured to transmit an access request frame to the relay station and monitor whether a relay signal is transmitted on the downlink channel, in a case that the first threshold detecting unit detects that the radio frequency signal strength of the downlink channel is less than the first threshold; and
   wherein the relay mode keeping unit is further configured to determine that the relay station is in the operating state and keep in the relay mode to complete the transmission request in a case that the relay signal is monitored by the downlink channel monitoring unit; and
   the offline mode switching unit is further configured to determine that the relay station is in the abnormal state and switch to the offline mode to complete the transmission request in a case that no relay signal is monitored by the downlink channel monitoring unit.

9. The communication mode switching device according to claim 8, further comprising:
   an uplink channel detecting unit configured to detect whether signal strength of the uplink channel meets a second threshold before the downlink channel monitoring unit is activated; and
   wherein the offline mode switching unit is further configured to switch to the offline mode to complete the transmission request in a case that the uplink channel detecting unit detects that signal strength for accessing the uplink channel is greater than or equal to the second threshold; and
   the downlink channel monitoring unit is further configured to transmit the access request frame to the relay station and monitor whether the relay signal is transmitted on the downlink channel, in a case that the uplink channel detecting unit detects that the signal strength for accessing the uplink channel is less than the second threshold.

10. The communication mode switching device according to claim 7, further comprising:
    wherein the first threshold detecting unit is further configured to, in a case that the offline mode switching unit is switched into a keeping state after the transmission request is completed, detect whether the radio frequency signal strength of the downlink channel meets the first threshold on reception of the transmission request;
    a relay mode switching unit is configured to determine that the relay station is in the operating state and switch to the relay mode to complete the transmission request, in a case that the first threshold detecting unit detects that the radio frequency signal strength of the downlink channel is greater than or equal to the first threshold; and an offline mode keeping unit is configured to determine that the relay station is in the abnormal state and keep in the offline mode to complete the transmission request, in a case that the first threshold detecting unit detects that the radio frequency signal strength of the downlink channel is less than the first threshold.

11. The communication mode switching device according to claim 7, further comprising:

a call admission unit configured to perform a call admission when a call request for a mobile station is received, in a case that the offline mode switching unit is switched into a keeping state after the transmission request is completed; and an end frame determining unit configured to determine whether an end frame of the call request is a relay signal on reception of the end frame;

wherein the relay mode switching unit is further configured to switch into the relay mode in a case that the end frame determining unit determines that the end frame is the relay signal; and the offline mode keeping unit is further configured to keep in the offline mode and switch into the keeping state in a case that the end frame determining unit determines that the end frame is not the relay signal.

* * * * *